US008725894B2

(12) United States Patent
Sridharan et al.

(10) Patent No.: US 8,725,894 B2
(45) Date of Patent: May 13, 2014

(54) TRANSPARENT AUTO-DISCOVERY OF NETWORK DEVICES LOGICALLY LOCATED BETWEEN A CLIENT AND SERVER

(75) Inventors: Murari Sridharan, Sammamish, WA (US); Deepak Bansal, Redmond, WA (US); Eran Yariv, Zichron (IL); Ronen Barenboim, Haifa (IL); Maxim Stepin, Redmond, WA (US); Alexander Malvsh, Bothell (IL)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/615,844

(22) Filed: Sep. 14, 2012

(65) Prior Publication Data

US 2013/0013805 A1    Jan. 10, 2013

Related U.S. Application Data

(63) Continuation of application No. 13/169,071, filed on Jun. 27, 2011, now Pat. No. 8,335,858, which is a continuation of application No. 11/958,374, filed on Dec. 17, 2007, now Pat. No. 7,970,928.

(51) Int. Cl.
*G06F 15/16* (2006.01)

(52) U.S. Cl.
USPC .......................................... 709/237; 709/200

(58) Field of Classification Search
USPC .......................................... 709/200, 224, 237
See application file for complete search history.

(56) References Cited

U.S. PATENT DOCUMENTS

| 5,909,549 A | 6/1999 | Compliment et al. |
|---|---|---|
| 6,442,144 B1 | 8/2002 | Hansen et al. |
| 6,490,617 B1 | 12/2002 | Hemphill et al. |
| 6,636,499 B1 | 10/2003 | Dowling |
| 6,795,403 B1 | 9/2004 | Gundavelli |
| 7,013,342 B2 | 3/2006 | Riddle |
| 7,260,632 B2 | 8/2007 | Shaffer et al. |
| 7,512,702 B1 * | 3/2009 | Srivastava et al. ............ 709/238 |
| 7,680,051 B2 | 3/2010 | Kumar et al. |
| 7,970,928 B2 | 6/2011 | Sridharan et al. |
| 2003/0112764 A1 | 6/2003 | Gaspard et al. |

(Continued)

OTHER PUBLICATIONS

"InCharge IP Discovery Guide Version 6.2", System Management ARTS Incorporated. pp. 1-140, Apr. 27, 2004.

(Continued)

*Primary Examiner* — El Hadji Sall
(74) *Attorney, Agent, or Firm* — Ben Tabor; Kate Drakos; Micky Minhas

(57) ABSTRACT

Discovery of intermediate network devices is performed using a technique that piggybacks upon the existing standard TCP (Transport Control Protocol) "SACK" (Selective Acknowledgment) option in a SYN/ACK packet so that discovery information may be shared between pair-wise-deployed peer intermediate devices when a TCP/IP connection (Transport Control Protocol/Internet Protocol) is first established between network endpoints using a conventional three-way handshake. Use of the SACK option is combined with another technique which comprises modifying the original 16-bit value of the TCP receive window size to a special arbitrary value to mark a SYN packet as being generated by a first peer device. The marked SYN when received by the second peer device triggers that device's discovery information to be piggybacked in the SACK option of the SYN/ACK packet. The first device then piggybacks its discovery information in the SACK option of the ACK packet which completes the three-way handshake.

20 Claims, 5 Drawing Sheets

(56) References Cited

U.S. PATENT DOCUMENTS

| | | |
|---|---|---|
| 2003/0123481 A1* | 7/2003 | Neale et al. .................... 370/466 |
| 2004/0243703 A1* | 12/2004 | Demmer et al. .............. 709/224 |
| 2004/0264368 A1 | 12/2004 | Heiskari et al. |
| 2005/0169193 A1 | 8/2005 | Black et al. |
| 2006/0209852 A1 | 9/2006 | Wakumoto et al. |
| 2006/0268932 A1 | 11/2006 | Singh et al. |
| 2008/0205445 A1 | 8/2008 | Kumar et al. |
| 2009/0157866 A1* | 6/2009 | Sridharan et al. ............. 709/224 |

OTHER PUBLICATIONS

"Nortel Networks: OPTeraMetro 1000 Series Ethernet Service Modules", Copyright 2003, 8 pages.

Don Jones, "Tips and Tricks Guides to Network Configuration Management", Alterpoint, pp. 1-20, Copyright 2004.

\* cited by examiner

TRANSPARENT AUTO-DISCOVERY OF NETWORK DEVICES LOGICALLY LOCATED BETWEEN A CLIENT AND SERVER

BACKGROUND

Computer networks typically include various devices distributed logically between endpoint client and server devices that are communicating. These various intermediate devices form hops that the data packets traverse as they are propagated through the network(s) until reaching the final destination. Through routing of the data packets, the endpoints are typically unaware of the intermediate devices. The data packet from one endpoint device has a destination of the other endpoint device that is the final destination for the packet, yet the intermediate devices, which are network-transparent, send and receive the data packets in order to deliver them to the destination.

The term "network-transparent" means that the endpoint client and service devices have no awareness of these intermediate devices. In some cases, an intermediate device that is network-transparent to the endpoints may need to be discovered for some purpose. That is, one of the endpoint devices or another intermediate device logically between the endpoint devices may need to become aware of the existence and of some properties of the network-transparent device in order to perform its function. For example, WAN (Wide Area Network) acceleration devices must typically be deployed pairwise as intermediate devices in a network in order to improve network throughput using a variety of techniques.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Discovery of intermediate network devices is performed using a technique that piggybacks upon the existing standard TCP (Transport Control Protocol) "SACK" (Selective Acknowledgment) option so that discovery information may be shared between pair-wise-deployed peer intermediate devices when a TCP/IP connection (Transport Control Protocol/Internet Protocol) is first established between network endpoints using a conventional three-way handshake.

When a client sends a SYN packet to initiate the connection, the first intermediate device intercepts the packet and modifies the value of the TCP receive window size to a special arbitrary value and passes the "marked" SYN packet with the modified value to the second intermediate device. The second intermediate device passes the SYN packet to the server which responds with the SYN/ACK packet of the three-way handshake. As the second intermediate device sees the modified TCP receive window size value in the marked SYN packet, it realizes that there is a peer at the client end of the network, and will piggyback its discovery information in modified fields of the SACK option of the SYN/ACK packet. The first intermediate device will respond with an ACK packet and include its own discovery information in the form of a SACK option so that the intermediate devices are able to discover each other.

Advantageously, the discovery can be performed in an automated manner that is completely transparent to the network endpoints. By performing discovery during the three-way handshake before any data is sent, there is no impact to the standard network flow or modification of standard TCP/IP behavior in any way. In addition, the present discovery process does not introduce any additional round trips between the client and server so there is no penalty imposed which can be particularly beneficial in those network environments having high latency.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
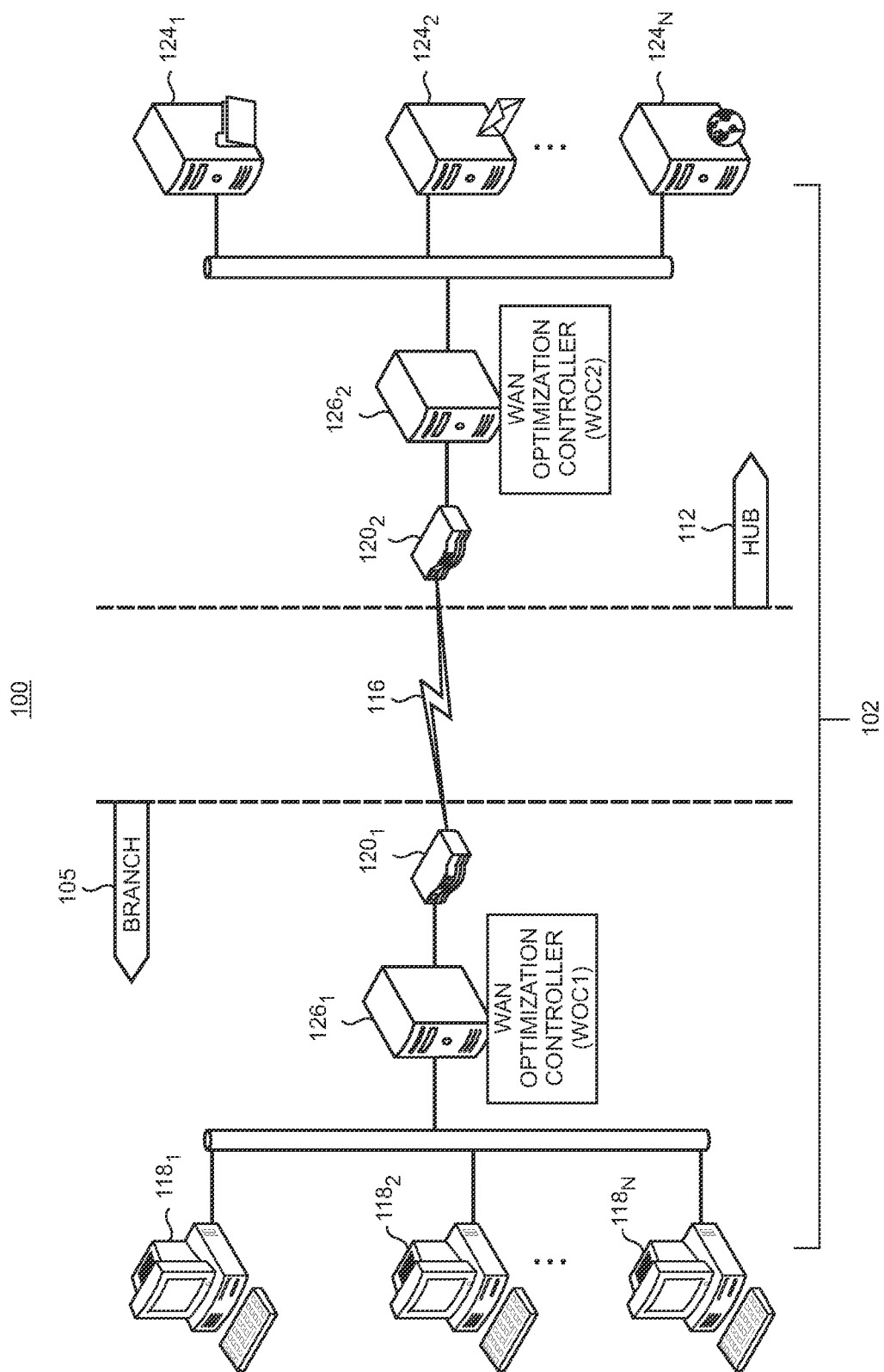
FIG. 1 shows an illustrative hub and branch networking environment using WAN optimization controllers in each subnet in which the present transparent auto-discovery may be implemented.

FIG. 1 shows an illustrative hub and branch networking environment 100 that includes a network 102 in which a branch 105 is coupled to a hub 112 over a WAN link 116. The term "branch" is used here to describe a remote location of any-sized organization that connects to a collection of resources provided by a "hub" located, for example, as part of a main or headquarters operation. Branch 105 includes a number of client machines $118_{1, 2 \ldots N}$ that are coupled to a router $120_1$, which places traffic onto the WAN link 116 and takes traffic from the link in both directions between the branch 105 and hub 112. Clients 118 commonly run business and productivity applications such as word processing, email, spreadsheets and the like.

A number of servers $124_{1, 2 \ldots N}$ are configured at the hub 112 to provide services to the clients 118 in the branch 105. Such services commonly include those provided by a file server $124_1$, mail server $124_2$, and web server $124_N$. However, it is emphasized that these servers are merely illustrative and the actual number and configuration of servers may vary from that shown and will generally be dependent on the requirements of a particular branch-hub deployment. The consolidation of server infrastructure into the hub 112 typically enables all maintenance, troubleshooting, security policy enforcement, backups, and auditing to be performed centrally which can significantly lower total ownership costs for most enterprises. The clients 118 and servers 124 are termed "endpoints" in the network 102.

WAN link 116 may operate over portions of one or more private networks and/or public networks such as the Internet. WAN link 116 is representative of many current WANs that are commonly utilized to support remote branch operations. Typical WAN issues include high network latency, constraints on bandwidth, and packet loss. Such limitations can constrain branch productivity. In addition, many business or productivity applications operating in the network 102 were developed for LAN (local area network) environments and are not particularly WAN-optimized.

Consequently, it is recognized that optimizing the utilization of the limited available WAN bandwidth can significantly contribute to better user experience in the branch 105. Optimizing WAN traffic provides users with the perception of a quick and responsive network and an overall experience in the branch that is more transparent, seamless, and LAN-like. In addition, many enterprises will benefit from lowered operating costs which result from a decrease in the traffic crossing the WAN link 116.

WAN optimization controllers (WOCs) 126$_1$ and 126$_2$ are located in respective subnets (i.e., the branch 105 and hub 112) of the network 102 in a symmetrical configuration. WOCs 126 are located in the direct traffic paths at opposite ends of the WAN link 116, and are coupled to routers 120. As the WOCs 126 and routers 120 are logically located (although not necessarily always physically located, as described below) between the network endpoints (i.e., clients 118 and servers 124), they are termed "intermediate devices." Other types of intermediate devices that are commonly deployed in typical networks include gateways, routers, proxy servers, firewalls, NAT (network address translation) devices, and the like.

While two examples of WOCs are shown in FIG. 1, it will be appreciated that other numbers and combinations of intermediate devices may be utilized depending on the topology and implementation details associated with a particular network. That is, while the present transparent auto-discovery arrangement can indeed be advantageously applied to WAN optimization controllers and devices which perform similar functions, is not necessarily limited to these devices. Many types and kinds of intermediate devices supplied from a variety of different manufacturers can generally be configured to utilize the present arrangement and realize the benefits provided therefrom.

In this illustrative example, WOCs 126 function to overcome some of the limitations in the WAN link 116 by optimizing traffic flowing over the link. Such optimization is typically implemented using one or more of various techniques, such as stateless and stateful data compression, caching, protocol specific optimizations, data pre-fetching, policy-based routing, rate shaping, quality of service ("QoS") techniques, and the like. WOCs are also referred to as WAN accelerators, WAN compression servers, WAN optimization appliances, or similar terms.

These optimization techniques are generally proprietary and typically require that WOCs 126 be used in pairs (i.e., pair-wise) in the network 102 in order to achieve the desired functionality. However, pair-wise utilization does not necessarily imply that WOCs 126 (or other type of intermediate device if used in a particular implementation) must always be physically embodied as discrete devices. In some implementations, for example, it may desirable to integrate the functionality that would normally be supported by an intermediate device into an endpoint on the network. In this case, for example, a software component could be installed on a network endpoint that would be utilized to perform transparent discovery of a single intermediate device. In addition, it is also possible in some scenarios for more than two intermediate devices to be used along a given network path between a server and client. Here, for example, the present transparent discovery could be implemented successively between pairs of intermediate devices in a chain along the path. Accordingly, there is typically a need for a given intermediate device to be able to discover its logically-deployed intermediate device peers in a network, regardless of the exact physical deployment configuration that is utilized in a particular implementation.

Generally, to the extent the network addresses of the intermediate devices are known by administrators, devices that need to communicate to perform their functions may be manually configured to establish the communication session between them. However, it can be burdensome to manually configure the devices because computer networks are dynamic by nature in that devices are added and removed, addresses are changed, and so forth. In addition, as it preferable to avoid any configuration changes in the firewalls between these intermediate devices, it is often not feasible to use a dedicated connection for discovery purposes. While solutions that use a database of registered intermediate devices which devices can query to identify its peers may be available, the discovery of such databases themselves may require some degree of manual configuration of intermediate devices that are deployed in a given network.

The present arrangement provides transparent discovery of intermediate network devices using a technique to piggyback discovery information to the existing TCP/IP stream established between client and server and then transparently intercept this information in the intermediate devices. The technique makes use of the fact TCP allows for enhancements to the protocol to be implemented as "options" within the TCP header. Here, blocks of 8 bytes in the existing standard SACK option are repurposed to pass discovery information between the intermediate WOCs 126.

The SACK option is chosen for the piggyback technique because it is a widely adopted option. It has been supported by most major operating systems for several years, and considerable testing has been completed to ensure that intermediate devices function properly when the option is utilized. In addition, the SACK option is unused during the three-way handshake. By definition, the SACK option is used for selective acknowledgment of received data. As the three-way handshake does not involve sending any data, the SACK option can be safely reused for other purposes without risk of clashing with an actual SACK. In addition, it is believed that SACK options will not be analyzed by intermediate devices (i.e., the SACK option will be ignored and the packet simply passed through) given that SACK is a standard TCP option that is supported by most operating system. However to be conservative, here the SACK is only piggybacked for the second and third packets of the three-way handshake (i.e., when the ACK bit is on).

As described in RFC 2018 published by the Internet Society, the SACK option is normally sent by a data receiver to inform the data sender of non-contiguous blocks of data that have been received and queued. The data receiver awaits the receipt of data (perhaps by means of retransmission) to fill the gaps in sequence space between received blocks. When missing segments are received, the data receiver acknowledges the data normally by advancing the left window edge in the Acknowledgment Number Field of the TCP header. However the SACK option does not change the meaning of the Acknowledgment Number Field.

Figure 2:
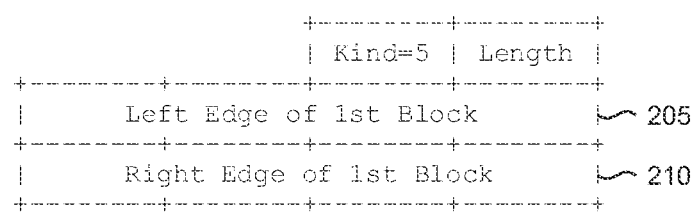
FIG. 2 shows a layout of fields used in the standard Selective Acknowledgment ("SACK") option for TCP.

Each contiguous block of data queued at the data receiver is defined in the SACK option by two 32-bit unsigned integers in network byte order. As shown in FIG. 2, a 4 byte portion (205) of an 8 byte block in the SACK option is used for the left edge of the block (i.e., the first sequence number of this block), while another 4 byte portion (210) is used for the right edge of the block (i.e., this is the sequence number immediately following the last sequence number of this block).

Figure 3:
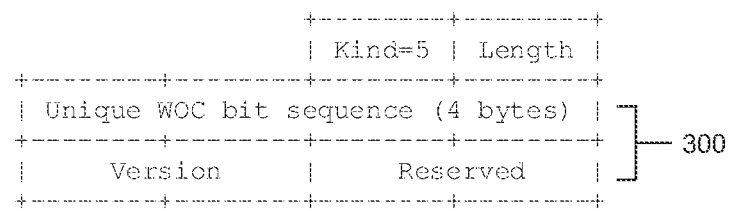
FIG. 3 shows an illustrative layout of fields used in a modified TCP SACK option in which intermediate device discovery information is piggybacked.

In the present arrangement for transparent auto-discovery of network devices, as shown in FIG. 3, the discovery information is added to the SACK option using a single 8 byte block 300. This is done to ensure that there is adequate space kept available for other TCP options as the TCP standard allocates a total of 40 bytes for all options. Table 1 below shows the field description (i e, kind), length and value for respective positions in the 8 byte block 300.

TABLE 1

| Field Description | Length in bytes | Value |
| --- | --- | --- |
| Type (kind) of the TCP option | 1 | 5 (SACK) |
| TCP option length | 1 | 10 |
| WOC type ID | 4 | Assigned by WOC vendor |
| WOC software version | 2 | Assigned by WOC vendor |
| Reserved | 2 | n/a |

The repurposing of the SACK option described above is combined with another technique to complete the implementation of transparent auto-discovery. This comprises modifying the original 16-bit value of the TCP receive window size to a special arbitrary value in a SYN packet that is used in the three-way handshake. The TCP receive window size is the amount of bytes in a memory buffer on a receiving host that is used to store incoming data on a TCP connection. After the connection is established, the receive window size is advertised in each TCP segment. Advertising the remaining space in the receive memory buffer is a receiver-side flow control mechanism that prevents the sender from sending data that the receiver cannot store. A sending host can only send at a maximum the amount of data advertised by the receiver before waiting for an acknowledgment and a receive window size update.

Modifying the TCP receive window size value allows the SYN packet to be "marked" to indicate that it was generated by an intermediate device (e.g., WOC $126_1$ in FIG. 1). RFC 3390 defines the initial TCP receive window size with values less than 4,380. Thus, any arbitrarily selected value above 4,380 will be viewed as a non-standard value and can be used to mark the SYN packet.

While the TCP receive window size is modified in the SYN packet, it is overridden to reset it to a correct value in the subsequently transmitted ACK packet. Since the modification and resetting is performed in the three-way handshake before any data is sent from the server, the modification itself may be safely performed without affecting normal TCP/IP behavior.

Figure 4:
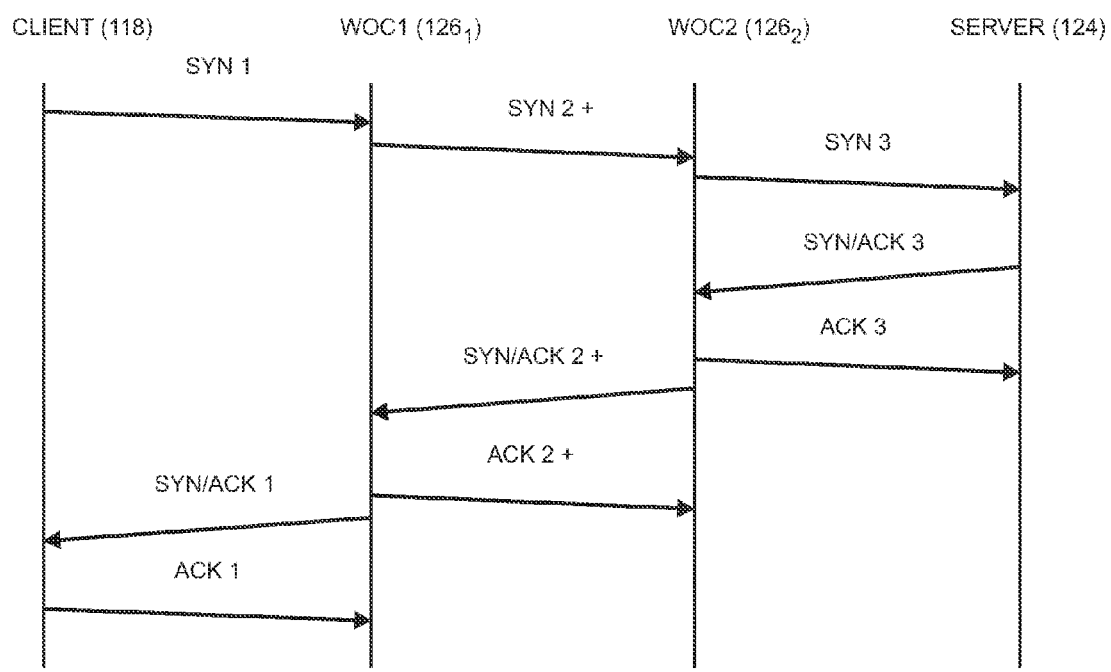
FIG. 4 shows an illustrative TCP packet flow that occurs in the networking environment shown in FIG. 1 when implementing the present transparent auto-discovery of intermediate network devices.

FIG. 4 shows an illustrative TCP packet flow that occurs in the networking environment shown in FIG. 1 when implementing the present transparent auto-discovery of intermediate network devices. As shown, a TCP three-way handshake methodology is followed where three types of packets are used to establish a TCP/IP connection: SYN, SYN/ACK, and ACK. In the packet flow shown in FIG. 4, 3 three-way handshakes are utilized to simultaneously establish the connection and perform auto-discovery of intermediate devices in the network in a transparent manner.

Discovery begins when one of the clients 118 in the branch 105 transmits a SYN packet, shown as SYN 1, to initiate a TCP/IP connection with an unknown host (e.g., a server 124 in the hub 112). WOC1 (i.e., WOC $126_1$ which is the device closest to the client) intercepts SYN 1 from the client 118 to the unknown host and proxies the connection. WOC1 marks the packet by modifying the TCP receive size window with the special arbitrary value to thereby notify other peer devices in the network of its presence. The marked SYN packet is shown as SYN 2+(where the "+" symbol indicates modification).

The marked SYN 2+packet is intercepted by WOC2 (i.e., WOC $126_2$ which is the device closest to the server) from an unknown server, and proxies the connection. It sends a regular SYN packet to the server 124 as SYN 3 using the client's IP address as the source address. The special value for the TCP receive window value will be recognized by WOC2 as an indication that SYN 2+ was generated by a peer WOC in the branch on the client side.

When the server 124 receives SYN 3, it accepts the connection and answers with a SYN/ACK packet which is shown as SYN/ACK 3 in FIG. 4. WOC2 sends ACK 3 to complete the first three-way handshake with the server 124.

WOC2 accepts the connection from WOC 1 and piggybacks its discovery information, including its ID and version, in the form of a SACK option to the outgoing SYN/ACK 2+. When WOC1 receives SYN/ACK 2+, including the discovery information from WOC2, it stores the server's IP address in a list of positively discovered devices.

WOC1 completes the second three-way handshake with WOC2 and piggybacks its own discovery information to the outgoing ACK 2+ using the SACK option which is received by WOC2 to complete the discovery process.

WOC1 accepts the connection from the client 118 and responds with SYN/ACK 1. The client 118 responds by sending an ACK packet, which is shown as ACK 1 to complete the third three-way handshake and establish the TCP/IP data connection. Once the discovery process is completed, the WOCs may apply one or more WAN acceleration techniques, for example compression, caching etc., as discussed above, to the data that is transmitted over the TCP/IP data connection.

Figure 5:
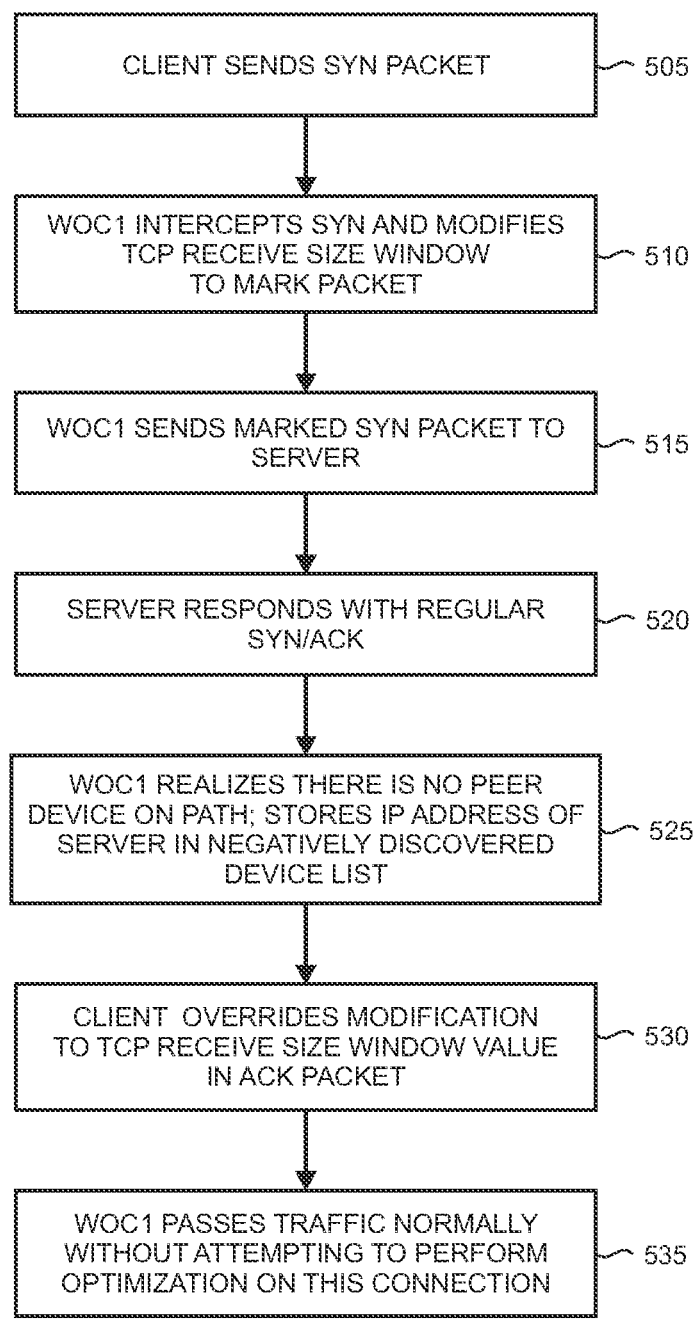
FIG. 5 shows a flow chart for an illustrative method applicable to a first error scenario in which the first intermediate device closest to the client is present and operative, but a second intermediate device is either inoperative or not present.

FIG. 5 shows a flow chart for an illustrative method applicable to a first error scenario in which the WOC1 in FIG. 1 is present and operative, but WOC2 is either inoperative or not present.

The client 118 sends a SYN packet to the server 124 to initiate a connection (505). WOC1 intercepts the SYN packet and modifies the TCP receive size window with the special value (510). The marked SYN packet is sent to server (515) which accepts the connection and responds with a regular SYN/ACK packet (520).

As this scenario assumes that WOC2 is either inoperative or not present, the SYN/ACK packet will not contain any discovery information in the SACK option. Consequently, WOC1 will realize that there is no other peer device on this particular path in the network and will store the server's IP address in a list of negatively discovered devices (525).

The client 118 will send an ACK packet to complete the three-way handshake with the server 124. The ACK packet will override the modification made to the TCP receive size window by WOC1 and restore the value to its original value (530). WOC1 will pass traffic through between the server 124 and client 118 without attempting to perform any optimization on this particular connection (535).

Figure 6:
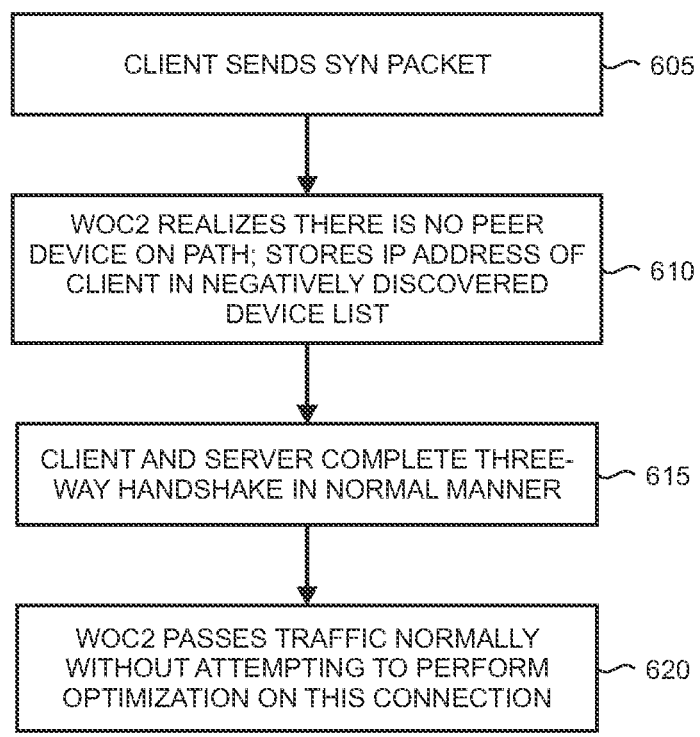
FIG. 6 shows a flow chart for an illustrative method applicable to a second error scenario in which a first intermediate device closest to the client is either inoperative or not present, but the second intermediate device is present and operative.

FIG. 6 shows a flow chart for an illustrative method applicable to a second error scenario in which the WOC1 in FIG. 1 is either not present or operative, but WOC2 is present and operative.

The client 118 sends a SYN packet to the server 124 to initiate a connection (605). WOC2 will realize that there is no peer on the path on the client side because the SYN packet does not contain the special TCP receive size window value, and will store the client's IP address in a list of negatively discovered devices (610).

The client 118 and server 124 will complete the three-way handshake in a normal manner (615). WOC2 will pass data traffic through between the server 124 and client 118 without attempting to perform any optimization on this particular connection (620).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for performing an automated process for discovering intermediate devices positioned between endpoints in a network, the method comprising the steps of:
   utilizing a SYN packet used in a TCP three-way handshake in the discovery process, the SYN packet being marked as a notification that a given intermediate device is present in the network;
   placing discovery information associated with an intermediate device in a SACK option; and
   completing the discovery process during the TCP three-way handshake,
       wherein the discovery information is piggybacked in a TCP/IP stream in the SACK option using a single 8 byte block and wherein the piggybacking is only implemented for a second and third packet of the TCP three-way handshake.

2. The method of claim 1 in which the SYN packet is marked by setting a TCP receive window size to a predetermined arbitrary value.

3. The method of claim 2 including a further step of using the SACK option with a SYN/ACK packet used in the three-way handshake.

4. The method of claim 3 including a further step of using the SACK option with an ACK packet used in the three-way handshake.

5. The method of claim 4 in which the automated process is performed by exchanging information between a pair of intermediate devices.

6. The method of claim 5 including a further step of providing a functionality that relies upon discovery of a peer intermediate device's existence or its properties in order to be implemented.

7. The method of claim 6 in which the functionality includes performing optimization of traffic on the network.

8. The method of claim 6 in which the discovery process is implemented between successive pairs of intermediate devices in order to create a chain of discovered intermediate devices between the endpoints.

9. A method of communicating discovery information to a second peer device in a network, the method comprising the steps of:
   marking a SYN packet used in a TCP three-way handshake by modifying a TCP receive window size of the SYN packet to a known arbitrary value, the SYN packet being intercepted by a first peer device from a first network endpoint that is seeking a connection with a second network endpoint;
   receiving a SYN/ACK packet used in the TCP three-way handshake, the SYN/ACK packet having a SACK option, the SACK option in the SYN/ACK packet including a block that contains discovery information for the first peer device; and
   adding a block of the SACK option in an ACK packet used in the TCP three-way handshake to include discovery information for the second peer device.

10. The method of claim 9 comprising a further step of including a device ID in the discovery information.

11. The method of claim 10 comprising a further step of including a device software version in the discovery information.

12. The method of claim 11 in which the arbitrary value is greater than 4,380.

13. The method of claim 9 in which the marking is performed without impacting TCP/IP behavior in the network.

14. The method of claim 9 in which the discovery information is piggybacked in a TCP/IP stream in the SACK option using a single 8 byte block.

15. The method of claim 14 in which the piggybacking is only implemented for a second and third packet of the TCP three-way handshake.

16. The method of claim 9 in which the first and second peer devices are each one of gateway, router, firewall, proxy server, NAT device, WAN optimization controller, WAN acceleration device, or WAN compression server.

17. A system for communicating discovery information to a second peer device in a network, the system comprising:
   a first network endpoint configured to seek a connection with a second network endpoint;
   a first peer device;
   a second peer device; and
   the second network endpoint,
       wherein said first peer device is configured to intercept a SYN packet from said first network endpoint, used in a TCP three-way handshake, from said first network endpoint, mark the SYN packet by modifying a TCP receive window size of the SYN packet to a known arbitrary value, and
       wherein said first peer device is further configured to receive a SYN/ACK packet used in the TCP three-way handshake, the SYN/ACK packet having a SACK option, the SACK option in the SYN/ACK packet including a block that contains discovery information for said first peer device, and
   wherein said first peer device is further configured to add a block of the SACK option in an ACK packet used in the TCP three-way handshake to include discovery information for said second peer device.

18. The system of claim 17 wherein said first peer device is further configured to receive a device ID in the discovery information.

19. The system of claim 18 wherein the discovery information is piggybacked in a TCP/IP stream in the SACK option using a single 8 byte block, and further wherein the piggybacking is only implemented for a second and third packet of the TCP three-way handshake.

20. The system of claim 17 in which said first and second peer devices are each one of gateway, router, firewall, proxy server, NAT device, WAN optimization controller, WAN acceleration device, or WAN compression server.

* * * * *